Aug. 2, 1955

C. B. SPASE 2,714,437

FRICTION CLUTCH

Filed June 14, 1954

INVENTOR.
CHARLES B. SPASE
BY D. Emmett Thompson
    A Horney

Aug. 2, 1955

C. B. SPASE 2,714,437

FRICTION CLUTCH

Filed June 14, 1954

INVENTOR.
CHARLES B. SPASE
BY D. Emmett Thompson
Attorney

United States Patent Office 2,714,437
Patented Aug. 2, 1955

2,714,437

FRICTION CLUTCH

Charles B. Spase, Nedrow, N. Y., assignor to Lipe-Rollway Corporation, Syracuse, N. Y., a corporation of New York Application June 14, 1954, Serial No. 436,630

4 Claims. (Cl. 192—69)

This invention relates in general to friction clutches, and more specifically to a friction clutch having a particularly compact structural arrangement capable of transmitting a relatively great amount of torque.

The clutch is intended principally for driving automobile accessories, such as air and refrigerating compressors, and is generally of the type disclosed in my copending application, Ser. No. 409,439, filed February 10, 1954.

The invention has as an object a friction clutch of the type capable of being engaged and disengaged, the clutch embodying a particularly compact structure not occupying any more room than a conventional drive pulley and which is capable of transmitting relatively great torque and which will operate over long periods of time without requiring servicing.

The invention consists in the novel features and in the combinations and constructions hereinafter set forth and claimed.

In describing this invention, reference is had to the accompanying drawings in which like characters designate corresponding parts in all the views.

In the drawings—

Figure 2:
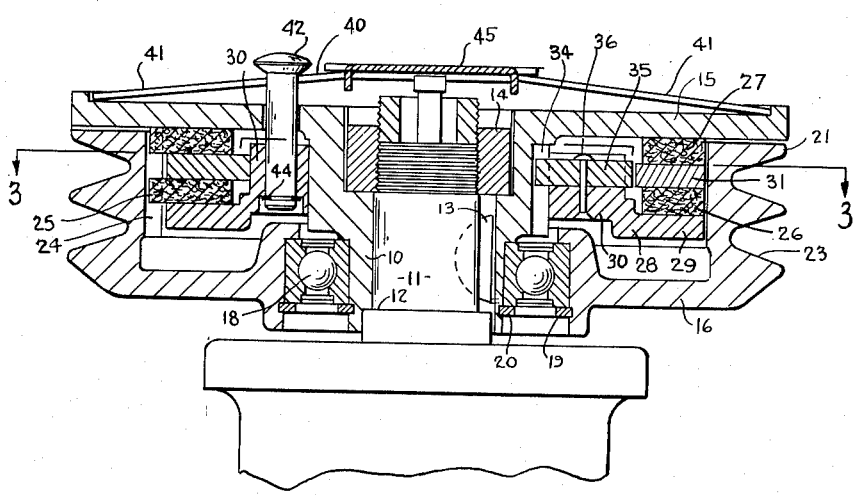
Figure 2 is a sectional view taken on line 2—2, Figure 1.
Figure 3:
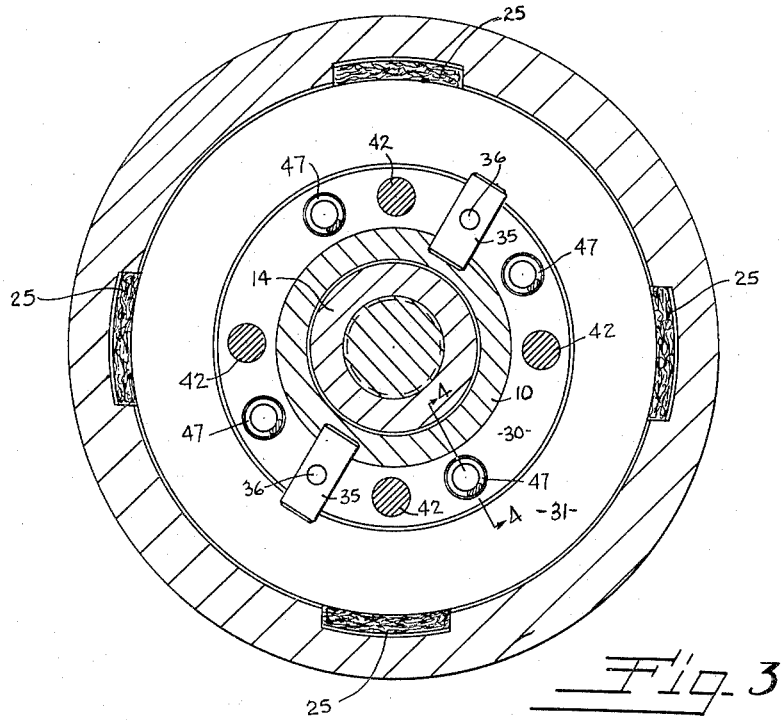
Figure 3 is a view taken on line 3—3, Figure 2.
Figure 4:
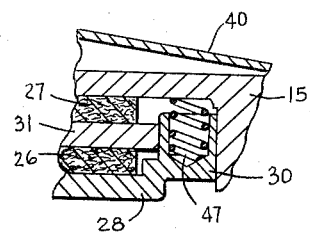
Figure 4 is a fragmentary view taken on line 4—4, Figure 3.

The clutch consists of a hub member 10 bored to be mounted on a driven shaft 11 of a device, such as a compressor, the shaft 11 having a shoulder 12 against which the inner end of the hub 10 is seated. The hub is fixedly secured to the shaft as by key 13 and is retained in place as by a nut 14 threaded on the outer end of the shaft. The driven hub 10 is formed at its outer end with a radial flange 15. A driving pulley 16 is journalled on the inner portion of the hub 10. As shown in Figure 2, the pulley 16 is mounted upon an anti-friction bearing 18, the outer race of which is retained in the pulley as by a snap ring 19, and the inner race is retained on the hub member, as by a snap ring 20. The pulley is formed with a cylindrical flange 21 confronting the discoidal flange 15, and encircling the hub member in spaced concentric relation thereto. The periphery of the flange 21 is provided with one or more grooves 23 whereby the pulley forms a sheave for V belt drive. The inner surface of the flange 21 is formed with four circumferentially spaced apart grooves or splines 24 to receive tangs or splines 25 on inner and outer annular driving members 26, 27, whereby the driving members 26, 27, are rotatable with the driving pulley and free to move axially thereof. The outer driving member 27 is positioned adjacent the inner side surface of the flange 15.

An annular driven member 28 is positioned on the hub 10 and has an outer portion 29 positioned between the inner driving member 26 and the pulley 16, and an inner hub portion 30 slidably mounted upon the periphery of the hub 10. A second annular driven member 31 is positioned upon the hub 30 of the first driven member and extends between the driving members 26. The surface of the hub 10 is formed with a plurality of axially extending keyways 34, and the outer end face of the hub portion 30 of the first driven member is formed with radially extending slots. In each of these slots, there is positioned a driving key 35. Preferably, the keys 35 are fixedly mounted in the slots, as by rivets 36. The inner edge or bore of the driven member 31 is formed with keyways or notches into which the outer ends of the keys 35 are slidably positioned, and the inner ends of the keys 35 extend into the keyways formed in the hub 10. With this arrangement, the driven members 28, 31, are shiftable individually relative to each other and to the hub 10.

Figure 1:
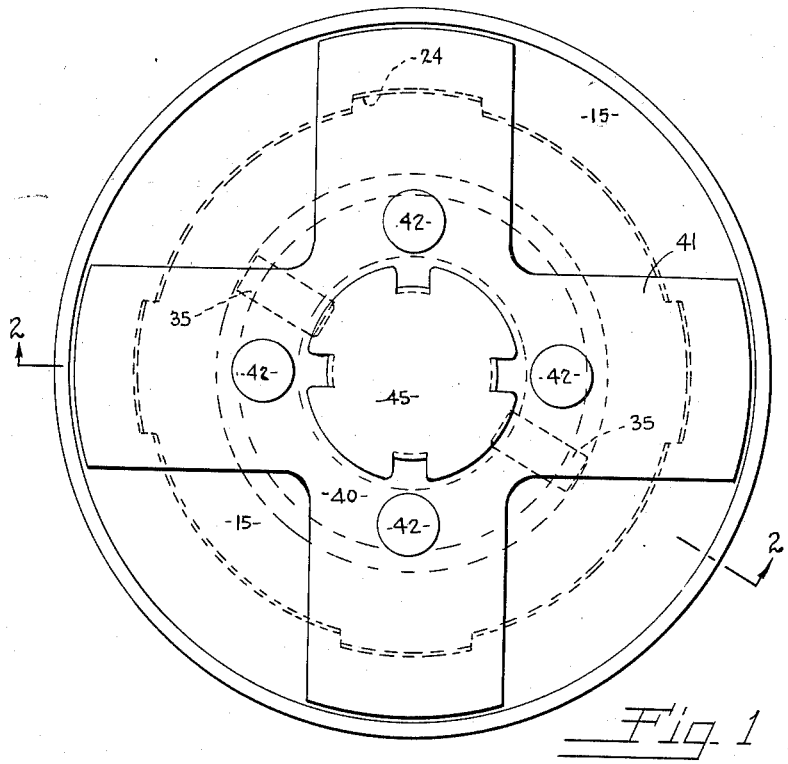
Figure 1 is a front elevational view of a clutch embodying my invention.

The driving members 26, 27, and the driven members 28, 31, are maintained in frictional engagement, when the clutch is engaged, by a dished or coned plate 40 having its concave side confronting the radial flange 15 of the driven hub and with its periphery engaging the radial flange adjacent the periphery of the flange. The plate shown in Figures 1 and 2 is not a complete disk but is formed with four radially extending arm portions 41. The plate is apertured to receive four pins 42 which extend through clearance holes in the flange 26 and through the hub 30 of the first driven member. These pins are provided at their inner ends with enlarged head portions, as snap rings 44. Plates of this type are known as Bellville disks. The plate 40 is formed of spring material and serves, in conjunction with the pins 42, as means for engaging the clutch, this being accomplished by drawing the annular member 28 against the adjacent driving member 26 which, in turn, is moved against the driven member 31 and it, in turn, is moved against the outer driving member 27, pressing it against the flange 15.

The plate 40 is formed with a central aperture to provide access to the nut 14 for mounting the clutch. This aperture is provided with a closure 45 against which a suitable clutch releasing member is actuated to move the central portion of the plate 40 inwardly to release the clutch.

The outer end face of the hub portion 30 of the first annular driven member is formed with a plurality of apertures in each of which there is mounted a compression spring 47 acting against the inner side of the flange 15. These springs 47 assure spacing between the driving and driven annular members when the clutch is released to prevent any drag on these parts.

It will be observed that the components of the clutch are easily assembled and when assembled, the entire clutch unit including the drive pulley consists of a completely assembled unit which may be mounted on the driven shaft in the same manner as the conventional drive pulley. Due to the arrangement of the multiple disk structure, the axial dimension of the clutch does not substantially exceed the corresponding dimension of a conventional drive pulley yet the clutch is capable of transmitting a relatively large torque and is engaged and disengaged by only a slight axial movement of the center portion of the plate 40.

What I claim is:

1. A friction clutch comprising a driven hub member having a discoidal flange at the outer end thereof, a driving pulley journalled for free rotation on the inner end of the hub and having a cylindrical flange confronting said discoidal flange and encircling the intermediate portion of the hub in spaced concentric relation thereto, inner and outer annular driving members mounted in said cylindrical flange for rotation therewith and having free movement relative thereto in a direction axially of the clutch structure, the intermediate portion of said hub being cylindrical and having a plurality of keyways in the surface thereof extending axially of the hub, an annular driven member mounted on the intermediate portion of said driven hub and having free axial movement relative thereto, said annular driven member being positioned between said inner driving member and said pulley, a second annular driven member arranged intermediate said annular driving members, key means slidably interlocking said driven annular members and said driven hub member whereby said driven annular members are individually shiftable relative to each other and to said driven hub member, a dished plate arranged with its concave side confronting the outer surface of the discoidal flange of said driven hub member and having its peripheral portion engaging said discoidal flange adjacent the periphery thereof, a series of pins carried by said dished plate and extending axially of the clutch structure through said discoidal flange and said first-mentioned annular driven member, said pins being provided on their inner ends with enlarged head portions, said dished plate being formed of resilient material and serving, in conjunction with said pins, as spring means urging said annular driven members and said annular driving members into frictional engagement.

2. A friction clutch comprising a driven hub member having a discoidal flange at the outer end thereof, a driving pulley journalled for free rotation on the inner end of the hub and having a cylindrical flange confronting said discoidal flange and encircling the intermediate portion of the hub in spaced concentric relation thereto, inner and outer annular driving members mounted in said cylindrical flange for rotation therewith and having free movement relative thereto in a direction axially of the clutch structure, the intermediate portion of said hub being cylindrical and having a plurality of keyways in the surface thereof extending axially of the hub, an annular driven member mounted on the intermediate portion of said driven hub and having free axial movement relative thereto, said annular driven member being positioned between said inner driving member and said pulley, a second annular driven member arranged intermediate said annular driving members, a plurality of driving keys carried by one of said annular driven members and slidably interlocking with said other annular driven member, the inner end portions of said keys slidably engaging the keyways in said driven hub, a dished plate arranged with its concave side confronting the outer surface of the discoidal flange of said driven hub member and having its peripheral portion engaging said discoidal flange adjacent the periphery thereof, a series of pins carried by said dished plate and extending axially of the clutch structure through said discoidal flange and said first-mentioned annular driven member, said pins being provided on their inner ends with enlarged head portions, said dished plate being formed of resilient material and serving, in conjunction with said pins, as spring means urging said annular driven members and said annular driving members into frictional engagement.

3. A friction clutch as defined in claim 1 wherein said driving keys are fixedly mounted in radially extending slots formed in said first annular driven member, and the outer ends of said keys slidably interlock with said second annular driven member.

4. A friction clutch comprising a driven hub member having a discoidal flange at the outer end thereof, a driving pulley journalled for free rotation on the inner end of the hub and having a cylindrical flange confronting said discoidal flange and encircling the intermediate portion of the hub in spaced concentric relation thereto, inner and outer annular driving members mounted in said cylindrical flange for rotation therewith and having free movement relative thereto in a direction axially of the clutch structure, the outer annular driving member being positioned in adjacency to the inner surface of said discoidal flange, the intermediate portion of said hub being cylindrical and having a plurality of keyways in the surface thereof extending axially of the hub, an annular driven member having a hub portion slidably mounted on said driven hub intermediate the discoidal flange thereof and said driving pulley, said annular driven member being positioned between said inner driving member and said pulley, a second annular driven member positioned on the hub portion of said first driven member and extending between said inner and outer annular driving members, said first annular driven member being formed with a plurality of radially extending slots, a driving key mounted in each of said slots, the outer end portions of said keys slidably interlocking with said second annular driven member, and the inner end portions of said keys slidably engaging the keyways formed in said driven hub member, a dished plate arranged with its concave side confronting the outer surface of the discoidal flange of said driven hub member and having its peripheral portion engaging said discoidal flange adjacent the periphery thereof, a series of pins carried by said dished plate and extending axially of the clutch structure through said discoidal flange and said first-mentioned annular driven member, said pins being provided on their inner ends with enlarged head portions, said dished plate being formed of resilient material and serving, in conjunction with said pins, as spring means urging said annular driven members and said annular driving members into frictional engagement.

References Cited in the file of this patent

UNITED STATES PATENTS

| | | |
|---|---|---|
| 2,047,737 | Lane | July 14, 1936 |
| 2,095,140 | Leeson | Oct. 5, 1937 |
| 2,481,834 | Foster | Sept. 13, 1949 |

FOREIGN PATENTS

| | | |
|---|---|---|
| 562,183 | France | Nov. 5, 1923 |